United States Patent [19]

Hansen

[11] Patent Number: 4,653,634
[45] Date of Patent: Mar. 31, 1987

[54] CONVEYOR BELT ASSEMBLY WITH SELF-ADJUSTING TENSION

[75] Inventor: Elmer K. Hansen, Sioux City, Iowa

[73] Assignee: Dodgen Industries, Humboldt, Iowa

[21] Appl. No.: 797,430

[22] Filed: Nov. 12, 1985

Related U.S. Application Data

[63] Continuation of Ser. No. 579,348, Feb. 13, 1984, abandoned.

[51] Int. Cl.[4] ............................................. B65G 23/44
[52] U.S. Cl. ...................................................... 198/813
[58] Field of Search ................................ 198/810, 813

[56] References Cited

U.S. PATENT DOCUMENTS 3,770,101 11/1973 Carlson ................................ 198/813
4,037,876 7/1977 Georg et al. ......................... 198/813
4,284,192 8/1981 Taylor ................................... 198/813

FOREIGN PATENT DOCUMENTS 847427 8/1952 Fed. Rep. of Germany .
1068622 11/1959 Fed. Rep. of Germany ...... 198/813

*Primary Examiner*—Joseph E. Valenza
*Assistant Examiner*—Kyle E. Shane
*Attorney, Agent, or Firm*—Zarley McKee, Thomte, Voorhees & Sease

[57] ABSTRACT

A conveyor belt assembly is provided with automatic tension adjustment. The assembly includes a conveyor belt trained about a pair of pulleys. A drive means powers one of the pulleys, each of which are mounted upon slidably interconnected frame members. A hydraulic cylinder in fluid communication with the motor and connected at opposite ends to each frame member automatically extends the first frame member with respect to the second frame member so as to increase the tension upon the conveyor belt as the load upon the belt increases. As the load upon the belt decreases, the fluid pressure within the motor and hydraulic cylinder decreases such that the first frame member is retracted with respect to the second frame member, thereby decreasing the tension upon the conveyor belt.

1 Claim, 5 Drawing Figures

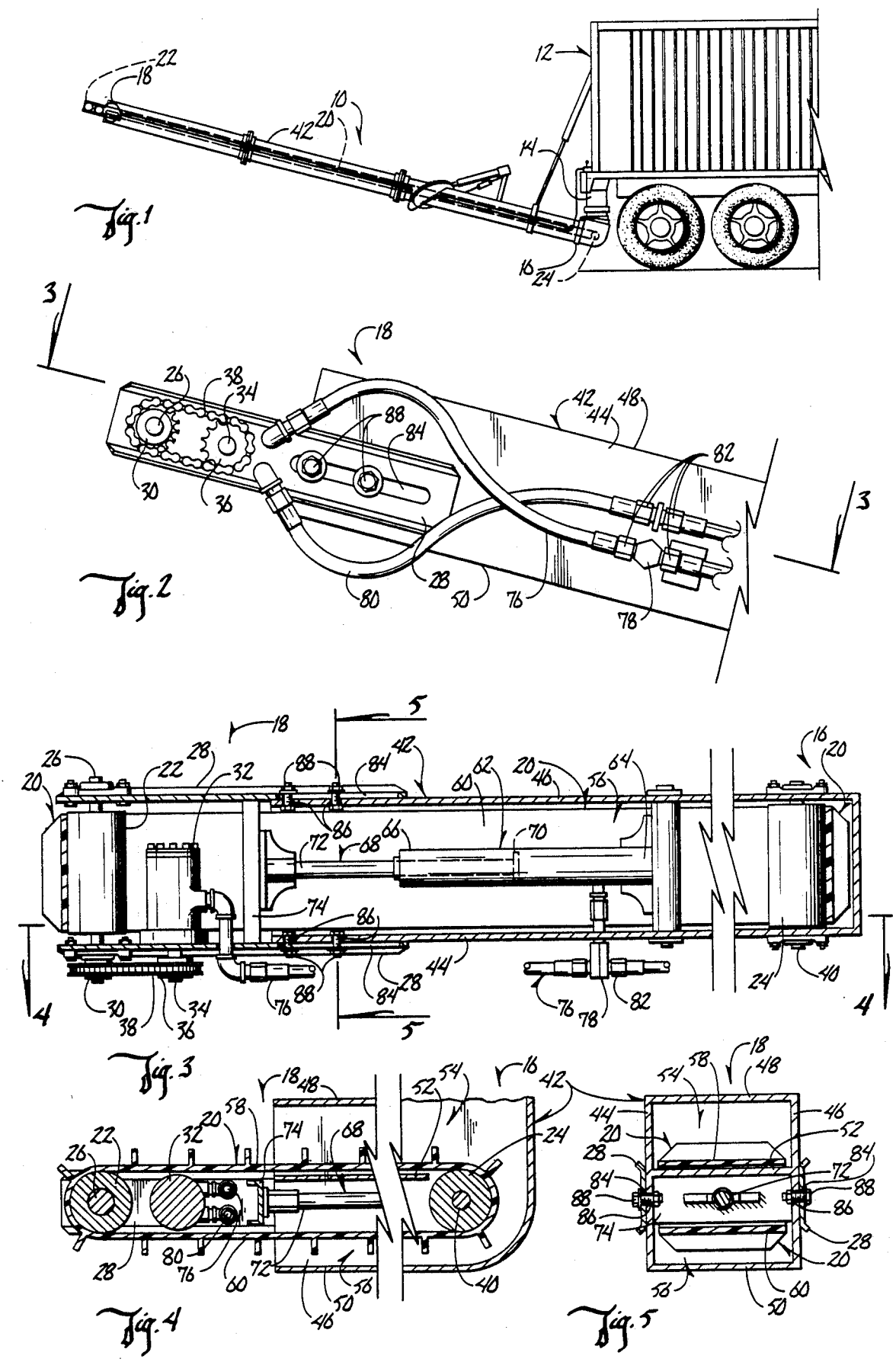

CONVEYOR BELT ASSEMBLY WITH SELF-ADJUSTING TENSION

This is a continuation of application Ser. No. 579,348, filed Feb. 13, 1984 now abandoned.

BACKGROUND OF THE INVENTION

A conveyor belt is often used to convey particulate material or the like from one location to another. Generally a conveyor belt is trained about a drive pulley at one end and an idler pulley at the opposite end. A motor is employed to rotate the drive pulley such that the conveyor belt moves about the two pulleys. A problem associated with a conventional conveyor belt setup is that the tension in the belt cannot be adjusted as the weight of the material conveyed thereby varies. A loose belt has a tendency to slip about the pulleys and thus not transport the material as efficiently. Also, a slackened belt is subject to increased wear thus requiring more frequent replacement of the belt and increased operating cost.

Therefore, a primary objective of the present invention is the provision of a conveyor belt system in which the tension of the conveyor belt is automatically adjusted.

A further objective of the present invention is the provision of a device that will sense the weight of material on the conveyor belt and adjust the tension of the belt accordingly.

Another objective of the present invention is the provision of a conveyor belt assembly in which the belt tension is automatically increased or decreased depending upon the power requirements of the drive motor.

A further objective of the present invention is the provision of a conveyor belt with self-adjusting tension that is economic to manufacture, and which is durable, safe, and efficient in use.

SUMMARY OF THE INVENTION

The conveyor belt assembly of the present invention includes a conveyor belt trained about a drive pulley and an idler pulley. The drive pulley is supported by a first frame member while the idler pulley is supported by a second frame member. The first frame member is slidably mounted upon the second frame member such that the tension in the belt can be varied. A hydraulic motor drives the drive pulley and is in fluid communication with a hydraulic cylinder. The cylinder is secured at one end to the second frame member and has a piston extending from the opposite end which is secured to the first frame member. When the motor requires more power to drive the belt in response to additional weight thereon, additional hydraulic fluid is provided thereby extending the piston so as to slide first frame member outwardly with respect to the second frame member such that the spacing between the idler pulley and drive pulley is increased, thereby increasing the tension in the conveyor belt. When the weight on the belt is decreased such that the motor requires less power to drive the drive pulley, the piston is retracted, thus decreasing the spacing between the idler pulley and drive pulley and thereby lessening the tension upon the conveyor belt.

BRIEF DESCRIPTION OF THE DRAWINGS

FIG. 1 is a side elevation view of a conveyor belt assembly adapted for use upon the rearward end of a truck trailer.

FIG. 2 is a side elevational view of the drive pulley end of the conveyor belt assembly.

FIG. 3 is a partial sectional top plan view taken along line 3—3 of FIG. 2.

FIG. 4 is a partial sectional side elevation view taken along line 4—4 of FIG. 3.

FIG. 5 is a sectional view taken along line 5—5 of FIG. 3.

DETAILED DESCRIPTION OF THE DRAWINGS

The conveyor assembly of the present invention is generally designated by the numeral 10 in FIG. 1. Conveyor assembly 10 can be used to transport particulate material or the like from one location to the other. As seen in FIG. 1, the assembly is attached to the rear end of a truck trailer 12 having an exit port 14. The material in the truck can thus be transported from the forward end 16 of conveyor assembly 10 to a storage bin or the like positioned adjacent the rearward end 18 of conveyor assembly 10.

Conveyor assembly 10 includes a conveyor belt 20, a drive pulley 22, and an idler pulley 24. Belt 20 is trained about pulleys 22 and 24. Drive pulley 22 is mounted upon a shaft 26 which is journaled within a first frame 28. On one end of shaft 26 is a sprocket 30.

Also mounted within frame 28 is a hydraulic motor 32 including a shaft 34 rotatably extending through frame 28 and having a sprocket 36 secured to the outer end thereof. A roller chain 38 is trained about sprockets 30 and 36 such that motor 32 drives drive pulley 22 about shaft 26.

Idler pulley 24 is mounted upon a shaft 40 journaled within a second frame 42. Frame 42 may be a chute extending substantially the length of conveyor assembly 10. Chute or frame 42 includes opposite sidewalls 44 and 46 interconnected by a top wall 48 and a bottom wall 50. On the interior of chute or frame 42 is a wall 52 spanning between sidewalls 44 and 46 so as to define an upper compartment 54 and a lower compartment 56. Upper compartment 54 houses the take-out portion 58 of belt 20 while lower compartment 56 houses the return portion 60 of belt 20. Interior wall 52 also serves to partially support the take-out portion of belt 20 carrying the particulate material from one point to another.

Within second frame 42 toward the rearward or discharge end 18 of conveyor assembly 10 is a hydraulic cylinder 62. Hydraulic cylinder 62 is fixed at one end 64 to second frame 42. The opposite end 66 of hydraulic cylinder 62 has an extensible piston 68 extending therefrom. Piston 68 has a first end 70 extending into cylinder 62 and a second end 72 secured to a cross brace 74 rigidly attached to first frame 28. Hydraulic cylinder 62 is a conventional displacement cylinder. A standard inlet line 76 from a hydraulic fluid source (not shown) provides communication between cylinder 62 and motor 32. Inlet line 76 includes a standard brass T-fitting 78 which allows the hydraulic fluid to flow both into the cylinder 62 and motor 32 simultaneously so as to provide equal pressure in both cylinder 62 and motor 32. An outlet line 80 connected to motor 32 permits hydraulic fluid to be returned to the hydraulic fluid reservoir. Conventional fittings 82 permit quick and easy attachment of lines 76 and 80 to hydraulic fluid source.

First frame 28 is slidably connected to second frame 42. First frame 28 has an elongated slot 84 on each side which aligns with a pair of holes 86 on either side of second frame 42. A nut and bolt assembly 88 extends through each hole 86 and the aligned slot 84 and allows first frame 28 to move inwardly and outwardly with respect to second frame 42, thereby decreasing or increasing the space between drive pulley 22 and idler pulley 24, respectively.

In operation, inlet line 76 and outlet line 80 are operatively connected to a hydraulic fluid source. Motor 32 is then actuated to drive belt 20. The speed of motor 32 is controlled by a standard throttle on the truck or power unit to which conveyor assembly 10 is attached. Actuation of motor 32 rotates shaft 34, thereby imparting rotation to shaft 26 of drive pulley 22 through the interconnection of sprockets 30 and 36 with chain 38. Grain or other particulate material can then be conveyed by belt 20. As the weight of the material being conveyed increases, motor 32 requires additional power to rotate drive pulley 22. Additional fluid from the hydraulic fluid source is supplied to inlet line 76 in response to the additional power needs of motor 32. A portion of the additional fluid goes to motor 32 to increase the hydraulic pressure therein so as to increase the power of motor 32, thereby maintaining the rotation of drive pulley 22. The remaining portion of the fluid enters cylinder 62 via T-fitting 78 such that the pressure within cylinder 62 is equivalent to that within motor 32. As the pressure within cylinder 62 increases, piston 68 is forced outwardly from cylinder 62, thereby moving first frame member 28 outwardly with respect to second frame member 42, thus increasing the tension upon belt 20. As the weight of the material being conveyed decreases, the power needs of motor 32 also decreases. As the power needs of motor 32 decrease, a portion of the hydraulic fluid therein can be vented through outlet line 80 thereby decreasing the pressure within motor 32 and simultaneously decreasing the pressure within cylinder 62. With decreased pressure in cylinder 62, the training of belt 20 about drive pulley 22 tends to move first frame member 28 inwardly with respect to second frame member 42. Thus, the tension upon belt 20 is reduced as the weight of the material thereon decreases. A conventional valving system controls the supply of hydraulic fluid.

From the foregoing it can be seen that a device for automatically adjusting conveyor belt tension is provided that accomplishes at least all of the stated objectives.

What is claimed is:

1. A conveyor belt assembly, comprising:

an elongated first frame having spaced apart side members, and having opposite first and second ends, a second frame longitudinally slidably secured to said second end of said first frame and having a longitudinal length substantially less than that of said first frame, and having opposite side members and outer and inner ends, an idler pulley positioned transversely between said side members on said first end of said first frame opposite to said second frame member, means securing said idler pulley to said first frame and for holding said idler pulley against longitudinal movement, a drive pulley positioned transversely between the side members on said second frame adjacent its outer end, a continuous conveyor belt trained about said drive pulley and said idler pulley, a single hydraulic cylinder mounted within said frames and connecting the inner end of said second frame to said second end of said first frame, a hydraulic motor mounted between the sides of said second frame adjacent said drive pulley, and having a transversely extending power shaft extending through one of said side members, said drive pulley having a drive shaft on the longitudinal axis thereof which extends through one of said side members of said second frame in a direction parallel to the power shaft of said hydraulic motor, drive connecting means on the outside of said second frame connecting the power shaft of said hydraulic motor and the drive shaft of said drive pulley;

power and return hydraulic conduits connected to the outside of said first and second frame members and extending along the substantial length thereof, said power conduit being connected to said hydraulic motor and said hydraulic cylinder, and said return conduit being connected to said hydraulic motor, and said power conduit being connected to a source of hydraulic power whereby increased power requirements of said hydraulic motor will increase the hydraulic pressure therein and within said hydraulic cylinder to move said first frame away from said second frame whereby the tension of said conveyor belt is increased, and whereby decreased power requirements of said hydraulic motor will decrease the pressure therein and within said hydraulic cylinder to move said first frame toward said second frame whereby the tension of said conveyor belt is decreased.

* * * * *